(12) United States Patent
Basso et al.

(10) Patent No.: US 7,877,774 B1
(45) Date of Patent: Jan. 25, 2011

(54) BROWSING AND RETRIEVAL OF FULL BROADCAST-QUALITY VIDEO

(75) Inventors: Andrea Basso, Ocean, NJ (US); Mehmet Reha Civanlar, Middletown, NJ (US); David Crawford Gibbon, Lincroft, NJ (US); Qian Huang, Rockville, MD (US); Esther Levin, Livingston, NJ (US); Roberto Pieraccini, Millington, NJ (US); Behzad Shahraray, Freehold, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 0 days.

(21) Appl. No.: 09/552,312

(22) Filed: Apr. 19, 2000

Related U.S. Application Data

(60) Provisional application No. 60/129,939, filed on Apr. 19, 1999.

(51) Int. Cl.
H04N 7/10 (2006.01)
(52) U.S. Cl. ............................ 725/44; 725/53; 725/115; 386/1
(58) Field of Classification Search .................... 725/92, 725/115, 139, 144, 37–61; 386/69, 46, 56, 386/92, 95, 1, 4; 360/13, 32
See application file for complete search history.

(56) References Cited

U.S. PATENT DOCUMENTS

| | | | | |
|---|---|---|---|---|
| 5,614,940 A * | 3/1997 | Cobbley et al. | ............. | 725/138 |
| 5,634,020 A | 5/1997 | Norton | | |
| 5,694,163 A * | 12/1997 | Harrison | ...................... | 725/110 |
| 5,703,655 A * | 12/1997 | Corey et al. | .................. | 348/468 |
| 5,818,510 A * | 10/1998 | Cobbley et al. | ............. | 725/139 |
| 5,821,945 A * | 10/1998 | Yeo et al. | ..................... | 345/440 |
| 5,835,667 A * | 11/1998 | Wactlar et al. | ............... | 386/96 |
| 5,859,662 A * | 1/1999 | Cragun et al. | ............... | 725/137 |
| 5,983,176 A * | 11/1999 | Hoffert et al. | ............... | 704/233 |
| 5,995,095 A * | 11/1999 | Ratakonda | ................ | 715/500.1 |
| 6,061,056 A * | 5/2000 | Menard et al. | .............. | 715/704 |
| 6,064,438 A * | 5/2000 | Miller | ......................... | 348/465 |
| 6,118,923 A * | 9/2000 | Rodriguez | ..................... | 386/69 |
| 6,119,101 A * | 9/2000 | Peckover | ...................... | 705/26 |
| 6,137,544 A * | 10/2000 | Dimitrova et al. | ........... | 348/700 |
| 6,169,542 B1 * | 1/2001 | Hooks et al. | ................. | 715/719 |
| 6,185,363 B1 * | 2/2001 | Dimitrova et al. | ............. | 386/69 |
| 6,185,527 B1 * | 2/2001 | Petkovic et al. | ............. | 704/231 |
| 6,192,187 B1 * | 2/2001 | Kinghorn | ..................... | 386/83 |
| 6,243,713 B1 * | 6/2001 | Nelson et al. | ............ | 707/104.1 |
| 6,282,549 B1 * | 8/2001 | Hoffert et al. | ............ | 707/104.1 |
| 6,336,093 B2 * | 1/2002 | Fasciano | ...................... | 704/278 |
| 6,349,275 B1 * | 2/2002 | Schumacher et al. | ........... | 704/8 |
| 6,360,234 B2 * | 3/2002 | Jain et al. | ................ | 715/500.1 |
| 6,363,380 B1 * | 3/2002 | Dimitrova | ................... | 707/740 |
| 6,370,504 B1 * | 4/2002 | Zick et al. | .................... | 704/251 |
| 6,374,260 B1 * | 4/2002 | Hoffert et al. | ............ | 707/104.1 |
| 6,389,168 B2 * | 5/2002 | Altunbasak et al. | ......... | 382/224 |
| 6,434,520 B1 * | 8/2002 | Kanevsky et al. | ........... | 704/243 |
| 6,492,997 B1 * | 12/2002 | Gerba et al. | ................ | 715/721 |

(Continued)

*Primary Examiner*—Annan Q Shang (57) ABSTRACT

A method includes steps of indexing a media collection, searching an indexed library and browsing a set of candidate program segments. The step of indexing a media collection creates the indexed library based on a content of the media collection. The step of searching the indexed library identifies the set of candidate program segments based on a search criteria. The step of browsing the set of candidate program segments selects a segment for viewing.

7 Claims, 7 Drawing Sheets

U.S. PATENT DOCUMENTS

| | | | |
|---|---|---|---|
| 6,496,228 B1 * | 12/2002 | McGee et al. | 348/700 |
| 6,498,921 B1 * | 12/2002 | Ho et al. | 434/362 |
| 6,523,061 B1 * | 2/2003 | Halverson et al. | 709/202 |
| 6,567,980 B1 * | 5/2003 | Jain et al. | 725/61 |
| 6,628,303 B1 * | 9/2003 | Foreman et al. | 715/723 |
| 6,643,620 B1 * | 11/2003 | Contolini et al. | 704/270 |
| 6,771,290 B1 * | 8/2004 | Hoyle | 715/745 |
| 6,788,882 B1 | 9/2004 | Geer et al. | |
| 6,819,863 B2 * | 11/2004 | Dagtas et al. | 386/46 |
| 6,961,954 B1 * | 11/2005 | Maybury et al. | 725/53 |
| 2007/0234196 A1 * | 10/2007 | Nicol et al. | 715/501.1 |

* cited by examiner

- PBS
  - ☐ newshour:(1998/07/22-1998/12/04): 12
- NBC
  - ☐ sunrise:(1997/02/21-1998/11/16): 18
  - ☐ today:(1996/09/14-1998/12/31): 33
  - ☐ nn:(19997/02/20-1998/12/31): 31
  - ☐ dateline:(1996/04/17-1998/12/15): 6
  - ☐ pres:(1996/04/21-1998/11/15): 11
- CNNfn
  - ☐ moneyline:(1997/07/07-1998/01/20): 2
  - ☐ dj:(1997/10/07-1998/07/30): 4
- CNN
  - ☐ primenews:(1997/02/18-1998/11/11): 18
  - ☐ science:(1997/06/22-1998/11/01): 2
  - ☐ crossfire:(1997/07/07-1998/11/26): 5
  - ☐ insidepol:(1996/12/16-1996/12/16): 1
  - ☐ lkl:(1997/06/16-1999/01/02): 7

FIG. 6

```
1999  January    2  CNN Larry King Live
1998  December  31  NBC Nightly News
                        Today
                25  NBC Today
                15  NBC Dateline
                 4  PBS The News Hour with Jim Lehrer
                 3  CNN Larry King Live
      November  26  CNN Crossfire
                16  PBS The News Hour with Jim Lehrer
                    NBCNightlyNews
                17  NBC Today
                        Today
                        Sunrise
                15  NBC Meet The Press
                14  NBC Nightly News
                12  CNN Larry King Live
                    NBC Today
                        Sunrise
                11  CNN Prime News
                 6  NBC Nightly News
```

PRIOR ART

BROWSING AND RETRIEVAL OF FULL BROADCAST-QUALITY VIDEO

The priority benefit of the Apr. 19, 1999 filing date of provisional application 60/129,939 is hearby claimed.

BACKGROUND OF THE INVENTION

1. Field of the Invention

The invention relates generally to a system for selective retrieval of video programming from a media library. In particular, the invention relates to a context driven automatic video indexer and a natural language user directed searcher and browser.

2. Description of Related Art

Recent technical advances are enabling a new class of consumer applications involving browsing and retrieval of full broadcast-quality video. Cable modems are bringing megabit bandwidth to the home. Set top boxes include low cost MPEG2 decoders and can also include an HTTP client for web browsing. Disk storage technology is riding a Moore's law curve and is currently at a dollar-per-megabyte point that makes large digital video archives practical. Selective delivery of digital video over IP (an Internet Protocol network) is less well established than these other technologies, but rapid progress is being made in this area. Systems that build upon these component technologies in novel ways can bring new services that meet consumers needs.

Video indexing is one of the areas in which further technology development is needed. To build systems for video database retrieval, we need standard storage and communication protocols at several levels for handling the video program attributes, key frames, associated text streams such as the closed caption, in addition to the usual issues associated with storage and delivery of the bulk media. Video program attributes include such things as the program title, copyright, etc. Currently international standard bodies are active in this area. In particular MPEG7 aims to address this as a natural evolution of the MPEG video standards of the past. For example, see MPEG-7 Context and Objectives, Requirements Group, ISO/IEC JTC1/SC29/WG11 (found at http://drogo.cselt.it/mpeg/standards/mpeg-7/mpeg-7.htm), incorporated herein by reference. The IETF is also working on standards focused in the areas where television and the Internet intersect. For example, see Philipp Hoschka, W3C TVWeb Interest Group, (also found at http://www.w3.org/TV/TVWeb/), Warner ten Kate, "TV URI Schemes—Requirements", Nov. 10, 1998 (also found at http://www.w3.org/TV/TVWeb/TVWeb-URI-Requirements-19981110), and Warner ten Kate, G. Thomas, C. Finseth, "Requirements TV Broadcast URI Schemes", Internet Draft, November, 1998 (also found at http://search.ietf.org/interent-draft-tenkate-tvweb-uri-reqs-00.txt), all incorporated herein by reference. Meanwhile the industry is moving ahead with implementations that may become de-facto standards in their own right. For example, at the system level we have Microsoft ASF (see Eric Fleishman, "Advanced Streaming Format (ASF) Specification," Internet Draft, Feb. 25, 1998, also found at http://www.microsoft.com/asf/resources/draft-ietf-fleischman-asf-01.txt, incorporated herein by reference) and Real Networks (see Real Networks, found at http://www.real.com, incorporated herein by reference). At the application level there are Virage and ISLIP and others. For example, see Virage, found at http://www.virage.com, Informedia, found at http://www.islip.com, FasTV, found at http://www.fastv.com, Magnifi, Inc., found at http://www.magnifi.com, and Exclaibur, found at http://www.excalibur.com, all incorporated herein by reference.

When these indexing components become stable, we will have all the building blocks necessary to create systems for browsing video databases that have been manually created. The major broadcasters will likely begin to generate indexes of each video program as part of the normal production process. However, for a significant time, smaller broadcasters will not have the necessary resources to do this. Further, it will be too costly to manually index the many large (several hundred thousand hour) video news archives that exist.

An automated video indexing system is required for these applications. Several such systems have been proposed (for example, at CMU and AT&T. For example, see H. Wactlar, Informedia, Researching Digital Video Libraries, 1998 (also found at http://www.informedia.cs.cmu.edu, and B. Shahraray and D. Gibbon, Automated Authoring of Hypermedia Documents of Video Programs, Proc. Third Int. Conf. On Multimedia (ACM Multimedia '95), San Francisco, Calif., November 1995, both incorporated herein by reference. A common aspect of the successful systems is true multimedia processing in which state of the art techniques from several disciplines are employed. In fact, in many cases it is necessary to extend existing methods in the process of applying them to the domain of video indexing.

The display device itself imposes an additional challenge for broadcast-quality video indexing systems intended for consumers. Typical home PC's are not well designed for the display of interlaced video, and the comparatively low resolution of television sets is not capable of rendering the browsing and retrieval user interfaces (UIs) of the aforementioned systems. We will focus on the home television as the display device. Much of the prior work assumes a desktop environment in which high-resolution graphics are available for the UI, and "postage stamp" quality video is sufficient. In these systems QCIF resolution video serves the purpose of identifying a particular video clip from a database, and for verifying that it is relevant to a given query. This usually is not sufficient for actually watching the video in the way to which a television viewer is accustomed.

There are several issues to be addressed when designing user interfaces for television-resolution applications. Even though the addressable resolution is approximately 640×480 for NTSC displays, the usable resolution is further reduced by overscan and interlacing. Fonts must be large, and preferably smoothed to avoid interlacing artifacts. Also, usage paradigms dictate that scrollbars are to be avoided. See WebTV Design Guide, WebTV Networks, 1998, as may be found at http://developer.webtv.net/docs/designguide, incorporated herein by reference. Prior systems employ high-resolution UIS to access low-resolution video. We are concerned here with low-resolution UIs for accessing high-resolution video.

SUMMARY OF THE INVENTION

It is an object of the present invention to overcome limitations in the prior art. It is yet another object to provide a method to index a media library. It is a further object of the present invention to format and display media library search results on a user interface targeted to a lower resolution display device such as a TV resolution display device.

These and other objects are achieved with a method that includes steps of indexing a media collection, searching an indexed library and browsing a set of candidate program segments. The step of indexing a media collection creates the indexed library based on a content of the media collection.

The step of searching the indexed library identifies the set of candidate program segments based on a search criteria. The step of browsing the set of candidate program segments selects a segment for viewing.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

In this patent we present an example system for selective retrieval of broadcast television news with full broadcast quality. However, persons skilled in the art will appreciate that the method and apparatus described herein apply to other media library functionality.

In this exemplary embodiment we describe a system for automatic broadcast-quality video indexing that integrates the fields of speaker verification, acoustic analysis, very large vocabulary speech recognition, contact based sampling of video, information retrieval, natural language processing, dialogue systems, and MPEG2 delivery over IP. Our audio classification and anchorperson detection (in the case of news material) classifies video into news versus commercials using acoustic features and can reach 97% accuracy on our test data set. The processing includes very large vocabulary speech recognition (over 230K-word vocabulary) for synchronizing the closed caption stream with the audio stream. Broadcast news corpora are used to generate language models and acoustic models for speaker identification. Compared with conventional discourse segmentation algorithms based on only text information, our integrated method operates more efficiently with more accurate results (>90%) on a test database of 17 one half-hour broadcast news programs. We have developed a natural language dialogue system for navigating large multimedia databases and tested it on our database of over 4000 hours of television broadcast material. Story rendering and browsing techniques are employed once the user has restricted the search to a small subset of database that can be efficiently represented in few video screens. We focus on the advanced home television as the target appliance and we describe a flexible rendering engine that maps the user-selected story data through application-specific templates to generate suitable user interfaces. Error resilient IP/RTP/RTSP MPEG-2 media control and streaming is included in the system to allow the user to view the selected video material.

Media Processing

To facilitate browsing of large collections of video material on limited resolution terminals, organizing the data in a structured manner, and presenting this structure through natural user interfaces is necessary for a successful system. The process of populating the collection must be automated as much as possible. At the highest level, video programs have attributes such as "network", and "genre." Any finer grained classification or segmentation will also aid the searching and browsing process. For the case of broadcast news video, we can automatically segment video into semantically meaningful units such as stories and summaries, and derive a content hierarchy. For example, see Qian Huang, Zhu Liu, Aaron Rosenberg, David Gibbon, Behzad Shahraray, "Automated Generation of News Content Hierarchy By Integrating Audio, Video and Text Information", Proc. IEEE International Conference on Acoustics, Speech, and Signal Processing, Phoenix, Ariz., Mar. 15-19, 1999, incorporated herein by reference.

Figure 1:
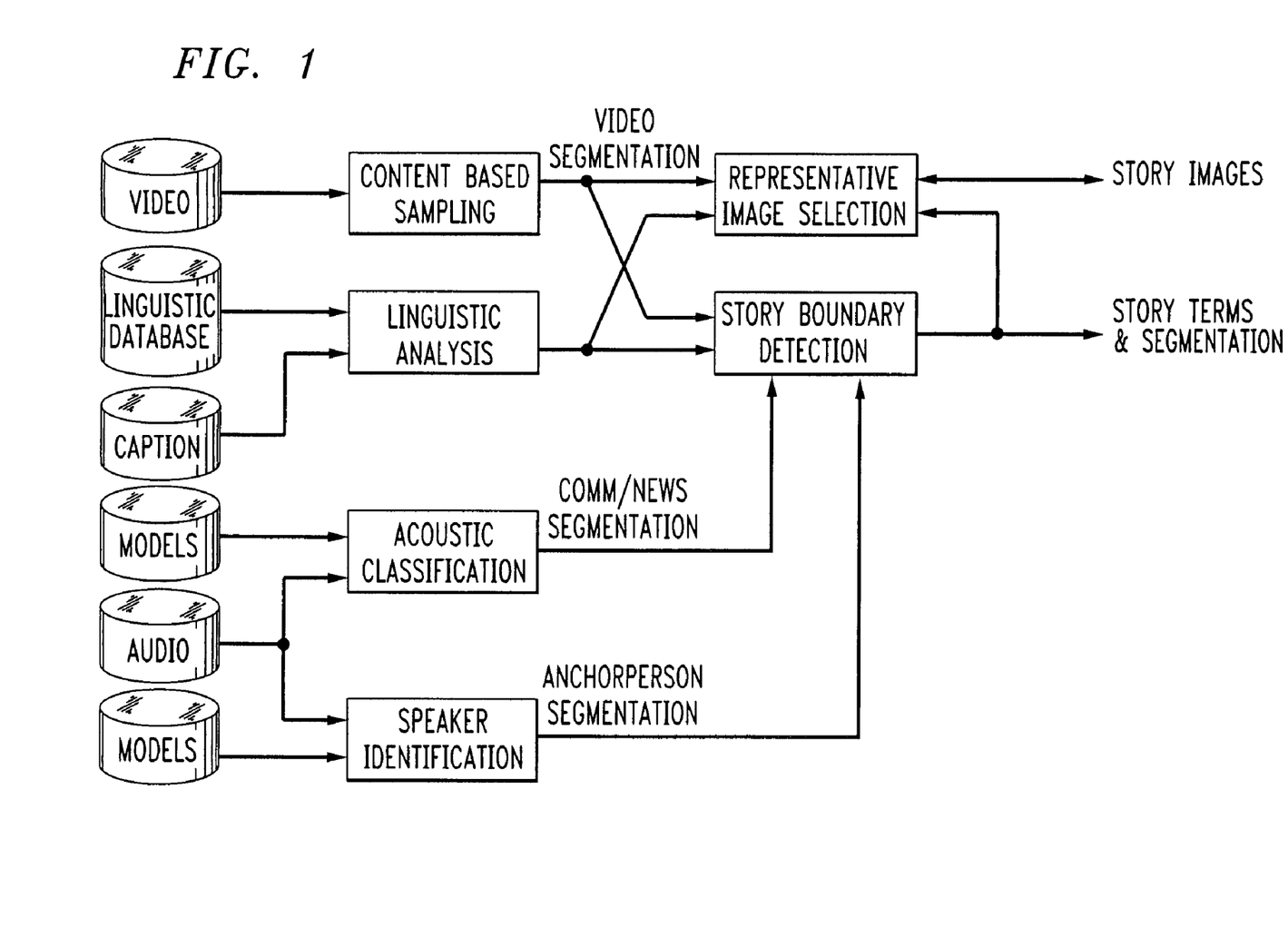
FIG. 1 is a functional block diagram of the media processing to determine story segmentation and representative images and terms according to the invention.

As an example herein, we will focus on broadcast news content, but much of the processing can be applied to other types of content as well (e.g., commercial/program segmentation, closed caption synchronization). Refer to FIG. 1 for an overview of the media processing. We assume that we are starting with elementary MPEG2 audio and video streams including a closed caption data stream. In a later section we describe the preprocessing required for streaming the media. Also the content based sampling and representative image selection process are covered in the section on "story rendering for browsing".

Audio Classification and Anchorperson Detection

Our method first classifies video into news versus commercials using acoustic features. Current algorithms can reach 97% accuracy on our test data set. Within the new segments, we further identify smaller segments containing the anchorperson. Gaussian mixture model based anchor and background models are trained using 12 mel cepstral and 12 delta cepstral features and then used to compute the likelihood values estimated from the audio signal. For example, see A. E. Rosenberg, I. Magrin-Chagnolleau, S. Parthasarathy, and Q. Huang, "Speaker detection in broadcast speech databases", in Proc. Of International Conference on Spoken Language Processing, Sydney, November 1998, incorporated herein by reference. With these techniques, we have been able to achieve a 92% correct segment identification rate, with a low false alarm rate on our test data set. For example, see Qian Huang, Zhu Liu, Aaron Rosenberg, "Automated semantic structure reconstruction and representation generation for broadcast news", in Storage and Retrieval for Image and Video Databases, Proc. SPIE 3656, (1999), incorporated herein by reference. By further integrating audio characteristics with visual information in recognizing the anchor, the detection precision on detected segments are significantly improved. Such recognized anchor segments serve two purposes. First, they hypothesize the news story boundaries because every news story starts with anchors's introduction (vise versa is not true though).

Story Segmentation

The recognized anchor speech segments the synchronized (see below) closed caption stream into blocks of text to which text analysis algorithms are applied to extract individual new stories. Compared with conventional discourse segmentation algorithms based on only text information, our integrated method operates more efficiently with more accurate results (>90%) on a test database of 17 one half-hour broadcast news programs. The second purpose in identifying anchor segments is to extract condensed news summaries or introductions spoken by the anchor which are separate from the body of the story. By playing back only the news summary, a user can experience "glancing at headline stories", similar to reading only the front page of a newspaper, before deciding which headline story to browse further.

Caption Synchronization

Real-time closed captioning lags behind the audio and video by a variable amount of time from about 1 to 10 seconds. Since the story segmentation uses all three media streams to perform the segmentation, errors can be introduced if the caption is not aligned with the other media streams. We have had success using a large vocabulary speech recognizer to generate very accurate word timestamps (although the word error rate is considerable). The system was built using broadcast news corpora (e.g., a large database formed from broadcast news) and has lexicon of over 230K words. For example, see John Choi, Donald Hindle, Julia Hirschberg, Ivan Magrin-Chagnolleau, Christine Nakatani, Fernando Pereira, Amit Singhal, Steve Whittaker, "SCAN—Speech Content Based Audio Navigator: A Systems Overview," International Conference on Speech and Language Processing (ICSLP'98), 1998, incorporated herein by reference. The recognizer runs in 5 times real time on a 400 MHz NT machine using the AT&T Watson Engine with about a 40% word error rate. After recognition, a parallel text alignment is performed to import the more accurate timing information from the automatic speech transcription to the more accurate transcription of the closed caption (the method is similar to that described in D. Gibbon, "Generating Hypermedia Documents form Transcriptions of Television Programs Using Parallel Text Alignment", in Handbook of Internet and Multimedia Systems and Applications, Edited by Borko Furht, CRC Press, December 1998, ISBN 0849318580, incorporated herein by reference.

Multimedia Database

The story segmentation, keywords, and story image descriptors are stored in a multimedia database along with the full closed caption text and the audio and video media. We have built upon our prior experience with a 4000+ hour heterogeneous multimedia database. For example, see B. Shahraray and D. Gibbon, Pictorial Transcripts: Multimedia Processing Applied to Digital Library Creation, IEEE Workshop on Multimedia Signal Processing, Princeton, N.J., 1997, pp. 581-586, incorporated herein by reference. The database is comprised primarily of broadcast television news programs from NBC, CNN and PBS over the period from 1994 through 1999. Each database entry includes closed caption text and still frames, and may also include 16 Kbs audio, 128 Kbps video, or 5 Mbps MPEG2 video. This large number of items proved useful in designing the dialogue interface described below.

Figure 2:
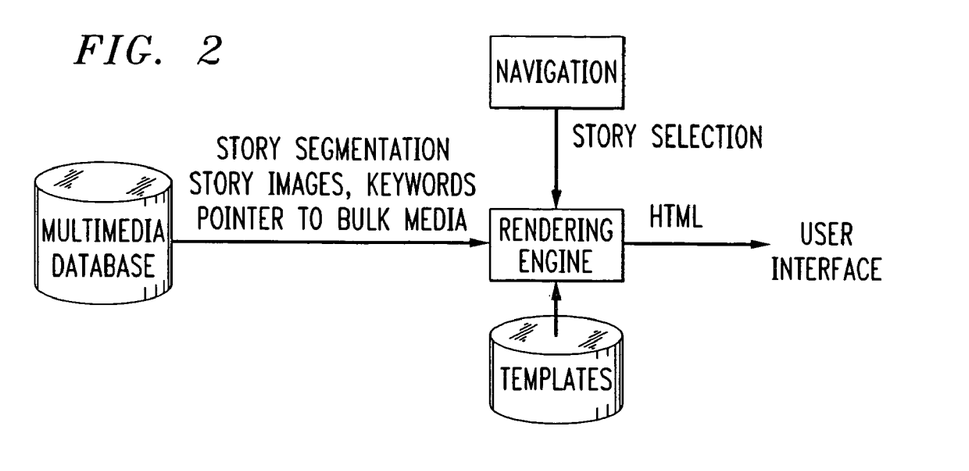
FIG. 2 is a functional block diagram of the user interface rendering according to the invention.

Through a navigation process described below, users select a particular story for display. A rendering engine takes the story data and maps it through templates to generate user interfaces. This template-based architecture allows the content to be used in a variety of applications. Here we use templates to render displays suitable for television display (e.g., black backgrounds, large fonts, etc.). By using a different template set, other interfaces to the multimedia data are produced by the rendering engine. See FIG. 2.

Archive Navigation

Figure 3:
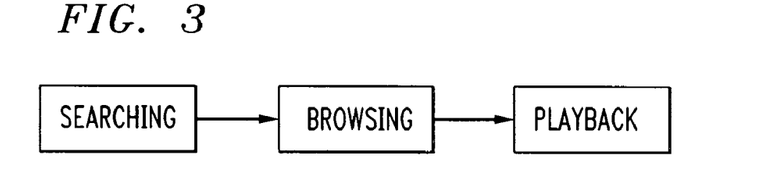
FIG. 3 is a functional block diagram of the primary modes of interaction with a video database according to the present invention.

When dealing with a large video archive, users engage in three distinct modes of interaction: searching, browsing, and video playback (see FIG. 3). Usually, the searching operation is used first to obtain a small number of documents (or video programs) of interest. This phase is followed by a browsing phase, which deals only with this small set. Of course there are exceptions to this statement of dealing only with a small set. For example, a large database may be browsed using a calender-like interface. Also some systems combine browsing with video playback. For example, see Smith, M., Kanade, T., "Video Skimming and Characterization through the Combination of Image and Language Understanding Techniques", Computer Vision and Pattern Recognition Conference, San Juan, Puerto Rico, pp. 775-781, June 1997 (also available at http://informedia.cs.cmu.edu/documents/CVPR97 smith.pdf), incorporated herein by reference. Users typically traverse many states in each phase, and they may loop back (e.g., from playback to browsing). For clarity, we do not show this in FIG. 3. For low-resolution terminals a natural language dialogue interface is well suited to the searching phase, while a more visually rich interface (e.g., with icon images acting as hypermedia anchors) is a better choice for the browsing phase. In this patent, we will follow this order by first describing a dialogue system for searching and then describing a browsing interface.

The browsing interface allows users to navigate the database within a particular video program. This interface terminates ultimately with a video playback request.

Natural Language Dialogue Interface for Searching

Figure 4:
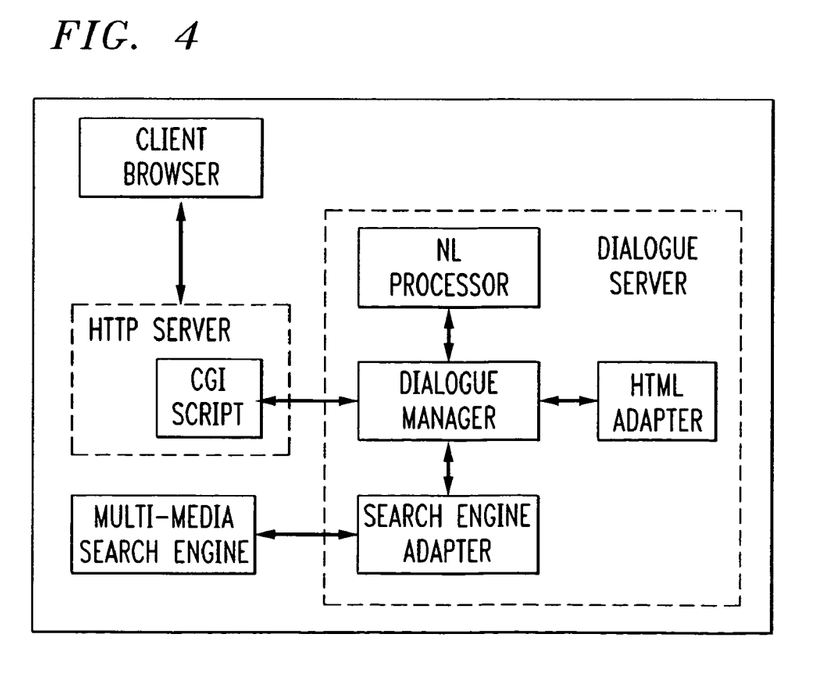
FIG. 4 is a functional block diagram of a dialogue system architecture according to the present invention.

To navigate a large database of video programs, a natural language dialogue system is appropriate. Without this, we must resort to complicated form-filling interfaces that are not well suited to the TV usage paradigm. FIG. 4 shows the architecture of the Natural Language Dialogue Interface. A user, through a client browser, sends a natural language request plus some context information form previous interactions (i.e., the dialogue state) to the HTTP server. The HTTP server forks (e.g., launches a new process or connection) a CGI script that connects (through TCP/IP protocol) to the dialogue server. The dialogue server, after analyzing the sentence and the dialogue state returns the proper answer in HTML format in addition to the upgraded dialogue state information that will be stored in the client browser as hidden fields.

The dialogue manager executes the strategy of the dialogue, (i.e., depending on the current dialogue state it invokes the appropriate action of a finite set of predetermined actions). For example see R. Pieraccini, E. Levin, and W. Eckert, "AMICA, the AT&T Mixed Initiative Conversational Architecture", Proc. EUROSPEEC 97, September 1997, Rhodes, Greece, incorporated herein by reference. The list of actions includes getting information from the input, merging information from the current user's input with the context store in the dialogue state, sending information to the output, generating a question for the user, or invoking one of the task specific auxiliary processors, such as the natural language (NL) processor, the HTML adapter or the search engine adapter.

The NL processors takes a sentence in input and generates its semantic description in terms of keyword/value pairs. For instance, given the sentence: What do you have about John Glenn from NBC during the past three weeks as input, the NL processor would generate the following semantic representation: query: LIST, topic: John Glenn, network: NBC, time: −3w. The NL processor is based on the stochastic conceptual paradigm. For example, see R. Pieraccini and E. Levin "A learning approach to natural language understanding", NATO-ASI, New Advances & Trends in Speech Recognition and Coding, Springer-Verlag, Bubion (Granada), Spain, 1993, incorporated herein by reference. Stochastic n-gram grammars represent portions of the sentence (i.e., concepts) that have associations to defined conceptual units. Some of them are task independent, such as query (e.g., I'd like to know, Please show me, What do you have about, etc.), time (e.g., during the past three months, between January and March this year, yesterday, etc.), and were automatically estimated on corpora collected from different applications. Others are task dependent, such as network (e.g., by NBC, on CNN, etc.), and were initially handcrafted and successively improved as more examples were collected with the system The search engine adapter converts the key/value semantic representation of the current query into the format required by the search engine, submits the query, gets the results and stores them in the current dialogue state in the form of a list of data tuples. The search engine includes an inverted index of the closed caption text from television news programs and a relational database of program attributes such as the network, show title, and broadcast date and time.

Figure 5:
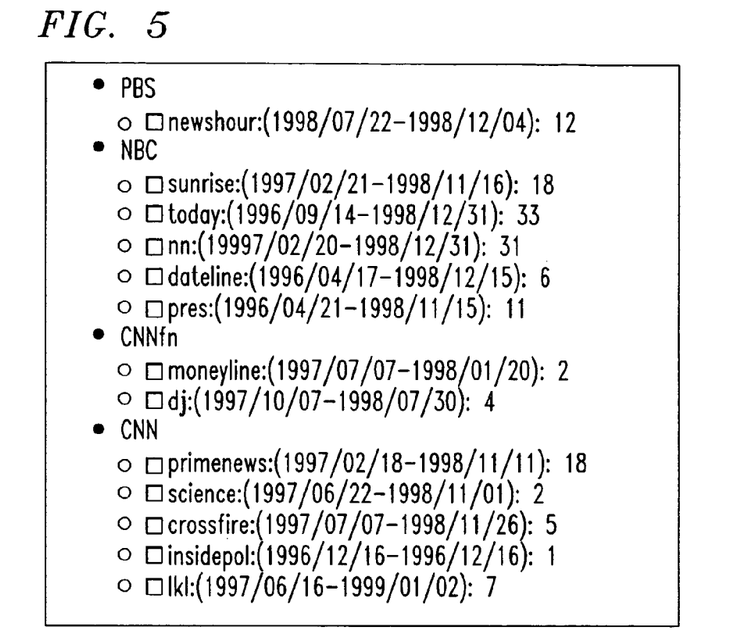
FIG. 5 is an exemplary query result represented as a tree with selectable nodes according to the present invention.
Figure 6:
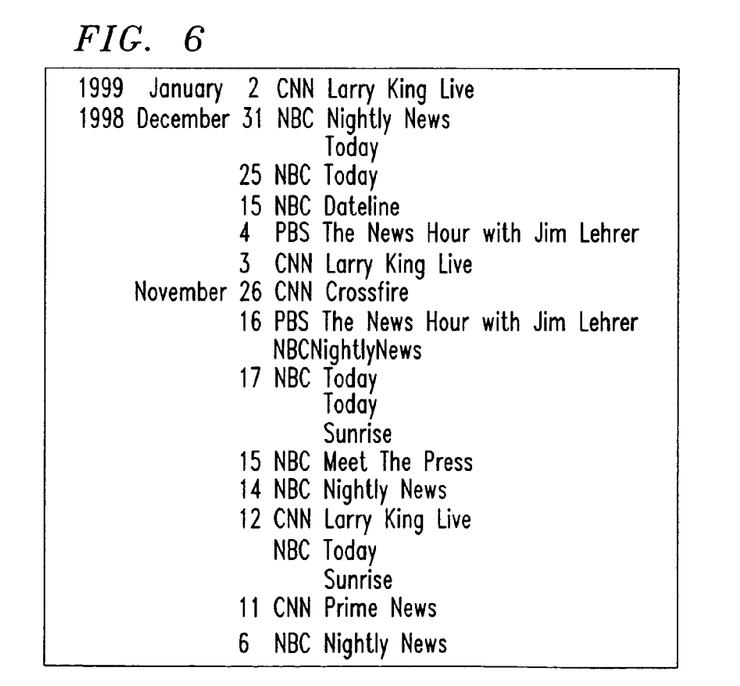
FIG. 6 is an exemplary compact tree with links to the located documents according to the present invention.
Figure 7:
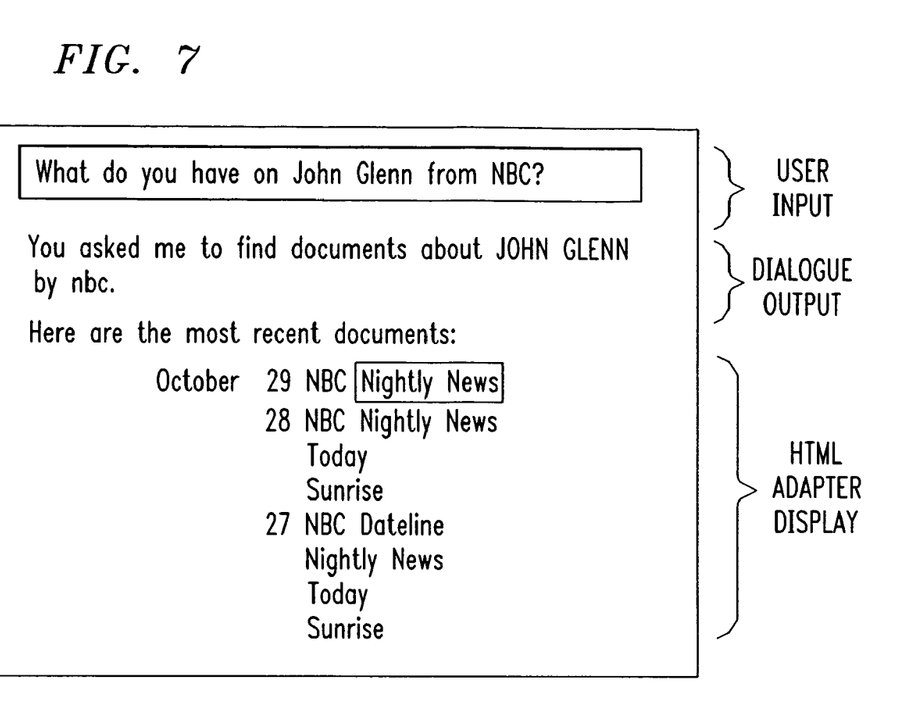
FIG. 7 is an exemplary multimodal dialogue interface display designed for TV resolution display devices according to the present invention.

The dialogue strategy has been designed in order to take advantage of several query types supported by the multimedia search engine with the goal of improving performance, and minimize network traffic. For example, for a given user's question, the dialogue manager first builds a query to extract only the total number matching documents (and not document's attributes). If this number is large, the system prompts the user to restrict the query (for instance by asking to select a particular range of time or a network). Only when the number is reasonable is the full request of document attributes sent to the search engine. We found that a better approach is a compromise in which a limited amount of information describing the query results is returned in the initial stage. This information is obtained by computing the frequency of documents grouped by date, network, and show, and is represented as a tree with selectable nodes as in FIG. 5. In the figure, each leaf node includes an indication of the number of items available. The user can either select a subset of the nodes and get a restricted set of documents, or refine the query using a natural language sentence (e.g., The documents by NBC and CBS between January and February). When the number of documents returned by a query is reasonable (in our case, less than 20), a compact tree representation of the features of the retrieved documents is displayed with hyperlinks to the actual documents, as in FIG. 6. The complete user interface is shown in FIG. 7.

Story Rendering for Browsing

To provide a concise and informative content based browsing interface, we construct visual presentations for the semantics at different levels of abstraction. For example, at a news program level, a table of contents coupled with a timeline representation can be automatically formed as described in Qian Huang, Zhu Liu, Aaron Rosenberg, "Automated semantic structure reconstruction and representation generation for broadcast news", in Storage and Retrieval for Image and Video Databases, Proc. SPIE 3656, (1999). The former provides a conceptual summary of the content within the news program while the latter offers a physical layout of the content along time. At news story level, a visual presentation is formed for each headline story in a most content revealing manner. A small number of k images are automatically selected from a set of key frames derived using content based sampling (see below) based on the histogram of keywords chosen in terms of their importance. This is determined by analyzing term frequencies in a news corpus collected from NBC Nightly News in 1997. For example, see Qian Huang, Zhu Liu, Aaron Rosenberg, David Gibbon, Behzad Shahraray, "Automated Generation of News Content Hierarchy By Integrating Audio, Video and Text Information", Proc. IEEE International Conference on Acoustics, Speech, and Signal Processing, Phoenix, Ariz., Mar. 15-19, 1999. Specifically, if H(t) denotes the histogram of the chosen keywords within the story boundary and A(t) denotes the area within the histogram covered under [H(t−1), H(r+1)], k images are chosen so that $$\sum_{l \in k} A(t_l)$$

is maximized. Images belonging to segments containing the anchorperson are not included in the set since they typically do not convey a large amount of visual information.

As mentioned above, a content based sampling algorithm is used to select key frames from the video stream. Several algorithms are available for this purpose (for example, see H. J. Zhang, A. Kankanhalli, and S. W. Smoliar, "Automatic Partitioning of Full-Motion Video," ACM/Springer Multimedia Systems, Vol. 1, No. 1, 1993, pp. 10-28, incorporated herein by reference). The goal of these algorithms is to minimize the number frames retained while maximizing the extend to which the images convey the visual information of the video. We have used an efficient algorithm that detects not only shot cuts, but also detects camera-induced changes (e.g., pan and tilt) as well as gradual transitions such as fades, dissolves and wipes. For example, see B. Shahraray, "Scene Change Detection and Content-Based Sampling of Video Sequences", in Digital Image Compression: Algorithms and Technologies, Proc. SPIE 2419, 1995, incorporated herein by reference. Another good option for systems designed for MPEG2 indexing is the class of algorithms that operate in the compressed domain (e.g., J. Meng, Y. Juan, and S. F. Chang, "Scene Cange Detection in a MPEG Compressed Video Sequence", in Digital Image Compression Algorithms and Technologies, Proc. SPIE 2419, 1995.).

Figure 8:
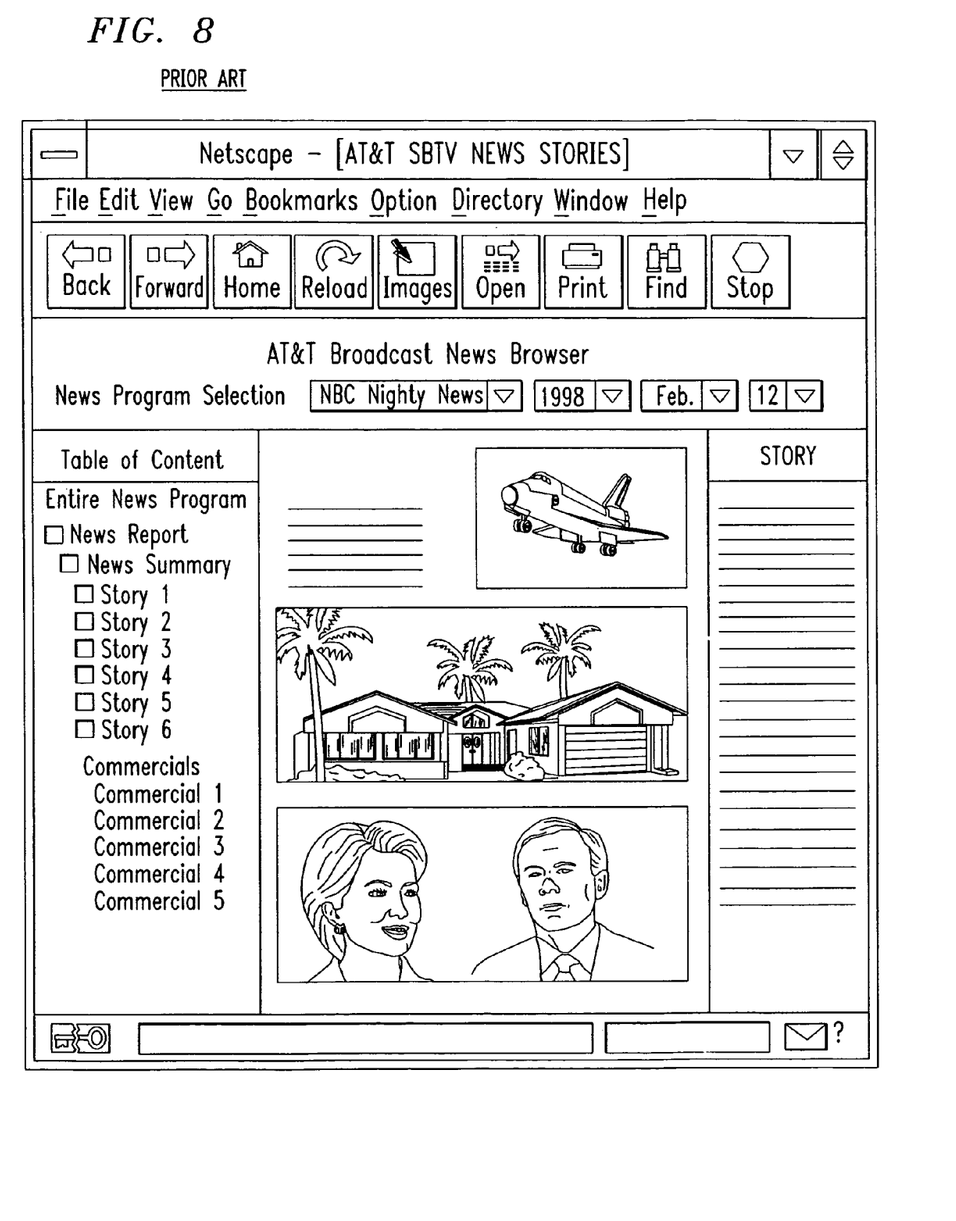
FIG. 8 is a known story representation suitable for a high-resolution terminal such as a modern computer monitor.

In applications with high-resolution terminals, the retained images, keywords, and closed caption itself are simultaneously displayed to represent the underlying news story (e.g., FIG. 8). While this interface displays a large amount of information, it clearly cannot be reproduced in low-resolution terminal applications.

Figure 9:
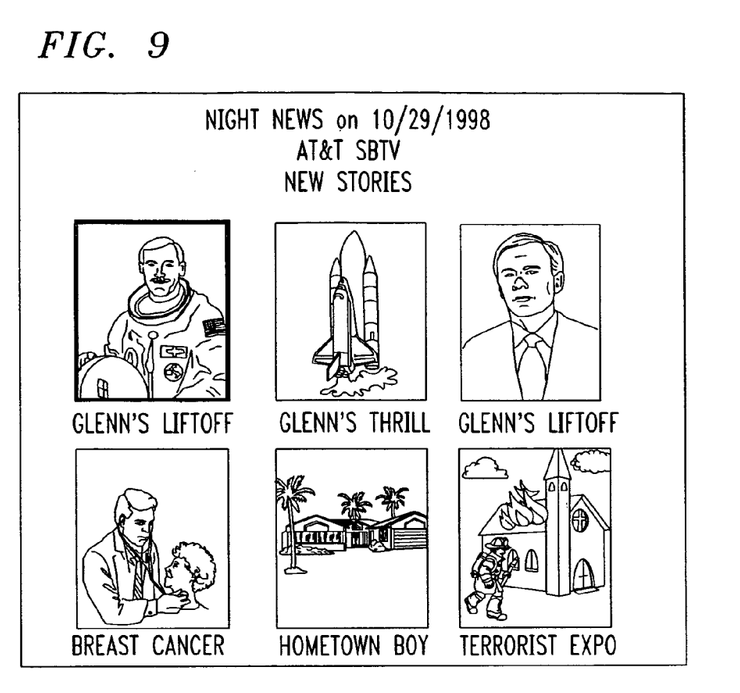
FIG. 9 is an exemplary multimodal table of contents page according to the present invention.
Figure 10:
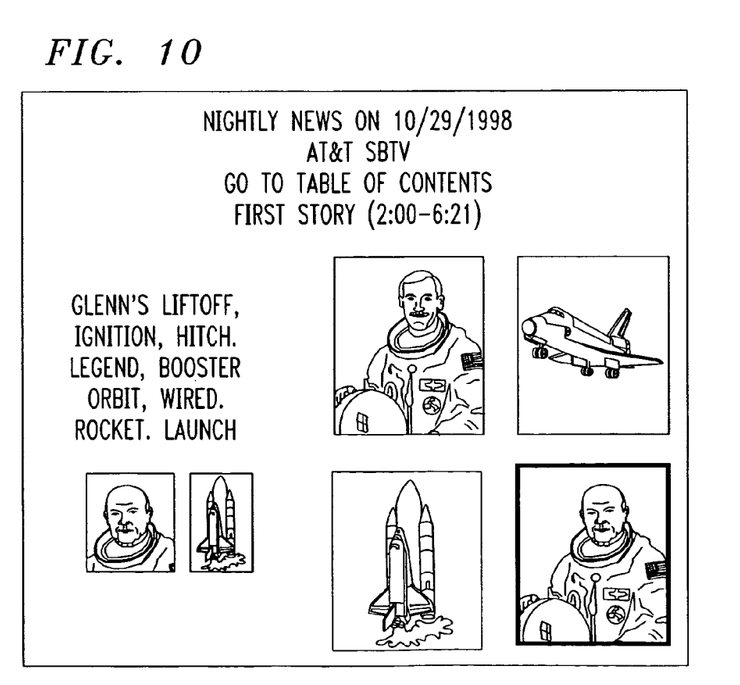
FIG. 10 is an exemplary multimodal story page according to the present invention.
Figure 11:
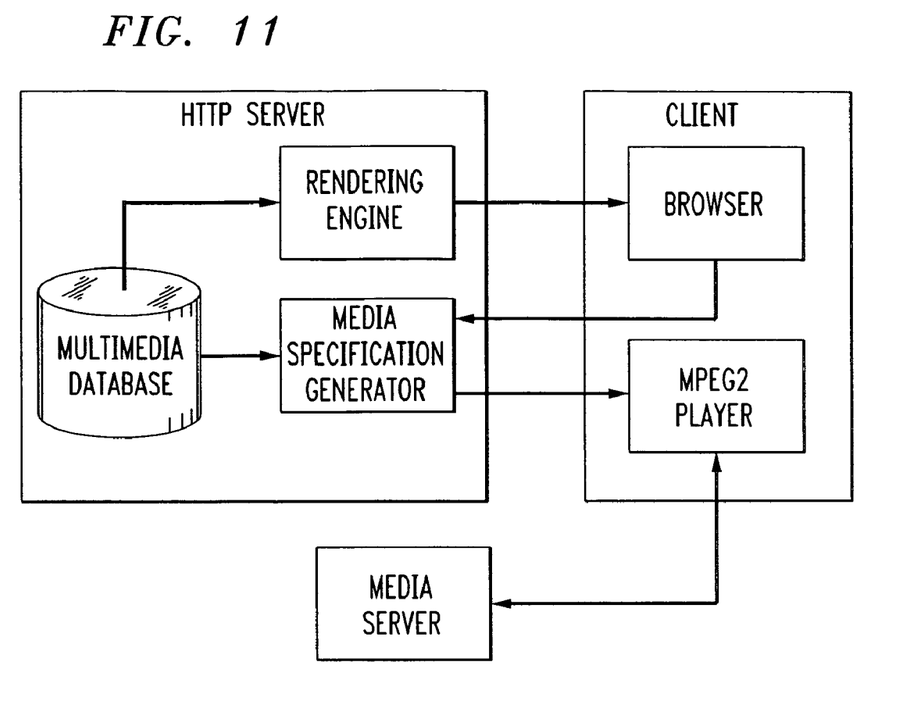
FIG. 11 is a functional block diagram of a client and server architecture according to the present invention.

Two views of the user interface designed for television resolution are shown in FIG. 9 and FIG. 10. Once the user has navigated down to the story level (FIG. 10), he or she can play the full story, or choose to start the playback from other points by selecting one of the story images. When video playback is initiated, the user's display switches to a full screen playback mode. When the video playback is stopped, the story page is brought back into view, and another segment can be selected or a new navigation session can be initiated. FIG. 11 depicts this process. The "media specification generator" takes input parameters via the CGI from the browser indicating the desired media segment. Standards in this area are evolving, but not yet mature. See Philipp Hoschka, W3C TVWeb Interest Group, (also found at http://www.w3.org/TV/TVWeb/), Warner ten Kate, "TV URI Schemes—Requirements", Nov. 10, 1998 (also found at http://www.w3.org/TV/TVWeb/TVWeb-URI-Requirements-19981110), and Warner ten Kate, G. Thomas, C. Finseth, "Requirements TV Broadcast URI Schemes", Internet Draft, November, 1998 (also found at http://search.ietf.org/interent-draft-tenkate-tvweb-uri-reqs-00.txt). The format of the specification can change depending upon the video storage subsystem. For example, in one of the implementation of the system we have used the ASX format with Microsoft's Theater server. The main drawback of this approach is the long start-up delay. We have developed our own system in which SDP is used for the media specification. With this system, we obtain better control of error resilience, and we adopt a more open, standards based architecture.

MPEG-2 Media Control and Streaming

Streaming video is a low cost solution that allows bringing live or prerecorded information to customers, employees and business partners worldwide across corporate Intranets and soon over the internet. There are several digital compression formats available today. MPEG-2 is a standard, formally accepted in 1994, developed by ISO/IEC/JTCI/SC29/WG11 and known in literature as ISO/IEC 13118 (ISO/IEC International Standard 13818, "Generic coding of moving pictures and associated audio information", November 1994, incorporated herein by reference.). It provides a set of methodologies to perform compression as well as the transport and multiplexing of video and audio. Thanks to the MPEG2 home video is currently available on DVD and it is the only standard that can provide comparable and superior quality that consumers and businesses expect to see on their TV, computer screens or during mission critical multimedia business conferences.

Among the recently developed multimedia protocol the IETF Real Time Protocol (RTP) is gaining attention from the network and multimedia community. RTP is designed to deliver various kinds of real time data over packet networks including non-guaranteed quality-of-service (QoS) networks. The services provided by the RTP include payload type identification, sequence numbering, time stamping and delivery monitoring. For example, see H. Schulzrinne, S. Casner, R. Frederick, V. Jacobson, "RTP: A Transport Protocol for Real-Time Applications", RFC 1889, January 1996, and M. Yajnik, J. Kurose, D. Towsley, "Packet Loss Correlation in MBONE Multicast network", IEEE Global Internet mini-conference GLOBECOM'96, 1996, both incorporated herein by reference. RTP typically runs on top of User Datagram Protocol (UDP) to make use of this multiplexing and checksum services. For example, see D. E. Comer, "Internetworking with TCP/IP," ISBN 0-13-468505-9, Prentice-Hall, NJ, 1991, incorporated herein by reference. RTP supports data transfer to multiple destinations using multicast distribution if this functionality is supported by the underlying network as in TCP/IP networks. RTP addresses the needs of real-time data transmission only and relies on other well-established network protocols for other communications services such as routing, multiplexing and timing. Additionally, RTP is based on the Application Level Framing (ALF) and Integrated Layer Processing (ILP) principles, which dictate using the properties of the payload in designing a data transmission system, as much as possible. See Clark, D., and Tennenhouse, D. "Architecture Considerations for a New Generation of Protocols," Proc. Of ACM SIGCOM '90, September 90, pp. 201-208, and M. F. Speer, S. McCanne, "RTP Usage with Layered Multimedia Streams", Internet Draft, draft-speer-avt-layered-video-02, December 1996, both incorporated herein by reference. For example, if we know that the payload is MPEG video, we should design our packetization scheme based on "slices" because they are the smallest independently decodable data units for MPEG video. This approach provides a much more suitable framework for MPEG-2 transmission over networks with high packet loss rates. RTCP is the companion control protocol that offers in the current specification some congestion control and receiver quality metric.

The Real Time Streaming protocol (RTSP) is an application-level protocol developed by IETF that provides the framework to allow on-demand delivery data streams, such as audio and video, in stored format or live. See Schulzrinne, et al., "Real Time Streaming Protocol (RTSP)", RFC 2326, April 1998, incorporated herein by reference. RTSP allows for the control of multiple data delivery sessions, the selection of the delivery channels such as multicast or unicast UDP, TCP and provides means for the selection of the delivery mechanisms based on RTP.

Media Preprocessing: the RTP Packetizer

An offline RTP packetizer packetizes MPEG-2 elementary video and audio streams. For example, the offline RTP packetizer is preferably compliant with D. Hoffman, G. Fernando, V. Goyal and M. R. Civanlar, "RTP Payload Format for MPEG1/MPEG2 Video" RFC2055, Internet draft, 1998, incorporated herein by reference. It supports different payload filling techniques where the number of slices per packet can be constant or variable to fill the MTU. The packetizer can implement different strategies for the repetition of the RTP's MPEG specific video header extension in the RTP packets generated from a given frame. Note that the overhead introduced by the use of the RTP specific video header extension can vary from a few to tens of Kb/s depending on the encoding parameters, and the presence of quantization, picture display, and picture temporal and spatial scalable extensions and the packetization strategy used. In this implementation, the MPEG specific header extension is repeated in all the packets of a given frame. The overhead for 2 slices per packet for a 4 Mb/s MPEG-2 video stream was approximately 6 Kb/s.

Media Server

The video/audio streaming system implements a client/server for the real-time delivery of MPEG-2 encoded audio/video streams over IP based on the Real Time Transport Protocol (RTP) and RTSP. See Schulzrinne, et al., "Real Time Streaming Protocol (RTSP)", RFC 2326, April 1998. The entire system is designed using off-the-shelf hardware and commercial operating systems. We emphasized a cost-effective design that can survive under extremely high packet losses and deliver acceptable quality audio and video under loss rates as high as $10^{-1}$.

Figure 12:
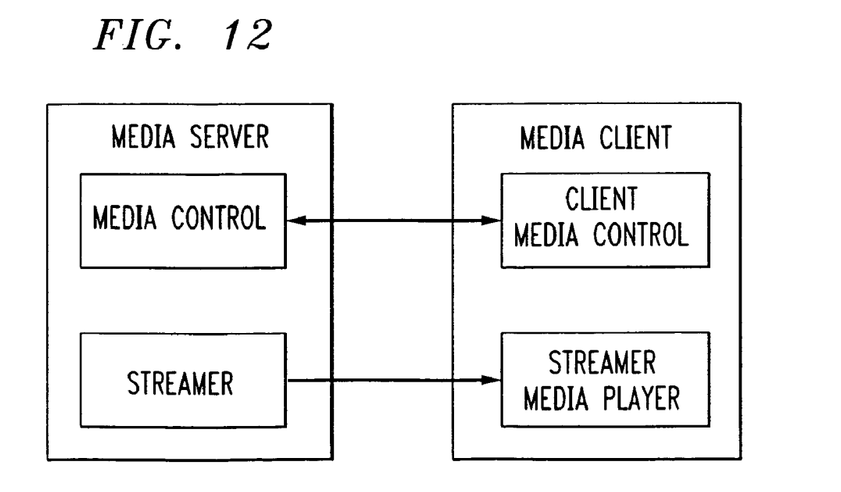
FIG. 12 is a functional block diagram of a media server and client architecture according to the present invention.

The building blocks of our architecture are shown in FIG. 12. The server is composed of two separate blocks, the media control and the streamer modules. The media control module is based on RTSP and has the task of setting up the connection and the media stream in response to a request from a client.

The streamer instead once instantiated, reads from a file the media data pre-assembled in RTP packets, it schedules and delivers the RTP packets over the network. The scheduling algorithm assigns a delivery time to every packet according to a scheduling policy. The policy we used targets matching the encoder's average rate. Furthermore, the scheduler measures the delivery time jitter due to the timer and rearranges the packet scheduling accordingly. For example, see A. Basso G. L. Cash, M. R. Civanlar "Transmission of MPEG-2 Streams over non-Guaranteed quality of Service Networks", PCS-97 10-12 Sep. 1997, incorporated herein by reference for further details.

Media Client

The media client is composed of two modules: the Media Control and the Media Player module. The media control module is based on RTSP and operates as a remote VCR control that allows to setup, start, stop and teardown of the audio/video streams. For the representation of a given clip we use RTSP container files which are storage entities in which multiple continuous media types pertaining to he same end-user presentation are present. Container files are a widely used means to store such presentations. Typically the media components of the presentation are transported as independent streams and the container file maintains a common context for those streams as the server end. Thus the server can keep a single storage handle open. In this application all the streams of a given clip are controlled via a single control message using an aggregate URL. See Schulzrinne, et al., "Real Time Streaming Protocol (RTSP)", RFC 2326, April 1998.

The following is an example of an RTSP session between the Media Server M and the Media Client C to control MPEG-2 video and MPEG-1 audio streams of the presentation of a video/audio clip on J. Glenn. The clip description is stored in a container file. The client has obtained an RTSP URL to the container file from the HTML page. (For illustrative purposes we assume here that the video is stored in clip files matched to story boundaries, and that the container files are static. For maximum flexibility, we actually store larger video files, and generate container files dynamically as described above and shown in FIG. 11). In a first phase, the client obtains a description in SDP format of the clip from the server. For example, see Handley V. Jacobson "SDP: Session Description protocol", RFC 2327 April 1998, incorporated herein by reference.

C->M: DESCRIBE rtsp://sbtv.research.att.com/glenn RTSP/1.0
    CSeq: 1
    M->C: RTSP/1.0 200 OK
    CSeq: 1
    Content-Type: application/sdp
    Content-Length: 164
    v=0
    o=-2890844256 2890842807 IN IP4 135.207.130.108
    s=SBTV RTSP Session
    I=J. Glenn Clip
    a=control:rtsp://sbtv.research.att.com/glenn
    t=0 0
    m=audio 0 RTP/AVP 14
    a=control:rtsp://sbtv.research.att.com/glenn/audio
    m=video 0 RTP/AVP 32
    a=control:rtsp://sbtv.research.att.com/glenn/video The client then issues a SETUP and specifies the client ports to use for the delivery of every media involved in the clip. In our case an MPEG-2 video and MPEG-1 audio.

C->M: SETUP rtsp://sbtv.research.att.com/glenn/audio RTSP/1.0
    CSeq: 2
    Transport: RTP/AVP; unicast; client_port=8000-8001
    M->C: RTSP/1.0 200 OK
    CSeq: 2
    Transport: RTP/AVP; unicast; client_port=8000-8001; sbtv.research.att.com_port=9000-9001
    Session: 12345678
    c->M: SETUP rtsp://sbtv.research.att.com/glenn/video RTSP/1.0
    CSeq: 3
    Transport: RTP/AVP; unicast; clientport=8002-8003;
    Session: 12345678
    M->C: RTSP/1.0 200 OK
    CSeq: 3
    Transport: RTP/AVP; unicast; clientport-8002-8003; sbtv.research.att.comport-9004-9005
    Session: 12345678

The client finally issues a request to the server to stream the video and audio starting from the beginning (Range: npt=0-)

C->M: PLAY rtsp://sbtv.research.att.com/glenn RTSP/1.0
    CSeq: 4
    Range: npt=0-
    Session: 12345678
    M->C: RTSP/1.0 200 OK
    CSeq: 4
    Session: 12345678
    RTP-Info: url=rtsp://sbtv.research.att.com/glenn/video; seq=9810092; rptime-3450012

During the presentation, the user pauses the stream to look for something else:

C->M: PAUSE rtsp://sbtv.research.att.com/glenn RTSP/1.0
    CSeq: 6
    Session: 12345678
    M->C: RTSP/1.0 200 OK
    CSeq: 6
    Session: 12345678

The media player module is based on a multithreaded architecture and it is responsible for converting the RTP packets into MPEG-2 elementary streams, handling the delay jitter and packet losses, inter- and intra-media synchronization, timely delivery of the bitstreams to the audio and video decoders, which are PC plug-in boards.

The packet capture is performed via asynchronous notification as in the server. At startup, all incoming RTP packets are discarded until the start of an I frame is detected by checking the RTP Picture Type field in the video specific header. In our implementation, the sequence header is repeated for every I frame so, the decoding is started as soon as an I frame is detected. The packet losses are detected from the discontinuities in the RTP sequence numbers. It is possible to distinguish between losses that effect just a part of the same picture and packet losses covering more than one picture by comparing the timestamp of the previous packet with the current one. If they are equal, the loss is contained within a frame. If not, the loss spans across one or more pictures. When the encoder is operating at a fixed frame rate, it is also possible to estimate the number of lost pictures by computing the difference between the last and the current timestamp. The GOP and picture header loss detection is performed as discussed in D. Hoffman, G. Fernando, V. Goyal and M. R. Civanlar, "RTP Payload Format for MPEG1/MPEG2 Video "RFC2055, Internet draft, 1998, and in A. Basso G. L. Cash, M. R. Civanlar "Transmission of MPEG-2 Streams over non-Guaranteed quality of Service Networks", PCS-97 10-12 Sep. 1997. Picture headers and corresponding extensions are regularly stored in the client memory and properly updated.

The concealment of lost slices is performed by inserting dummy slices in their place that instruct the hardware decoder to display the corresponding slices from the previous picture.

The consistency of the reconstructed frame is checked before it is delivered to the hardware decoder. The status of the hardware decoder is constantly monitored to provide support for potential decoding errors that can arise after error concealment also. The performance of the error detection and concealment techniques have been tested by simulating bursty and isolated losses according to the experimental data presented in for the MBONE. For example, see M. Yajnik, J. Kurose, D. Towsley, "Packet Loss Correlation in MBONE Multicast network", IEEE Global Internet mini-conference GLOBECOM'96, 1996. We were able to conceal packet loss rates up to $10^{-1}$ with visible degradation while rates of $10^{-3}$ seemed to be acceptable for both audio and video.

We have presented a method and system for searching, browsing, and retrieval of broadcast quality video over IP networks. The target appliance for this application is the advanced home television. We have described methods to work around the limitations imposed by these low-resolution devices. These include a dialogue system and a story segmentation method that facilitate searching and browsing of large multimedia databases. We have presented a system for delivery of MPEG2 streams over IP networks that is standards compliant (e.g., it used RTP, RTSP, and SDP).

Having described preferred embodiments of a novel method and system to selectively retrieve of video programming from a media library (which are intended to be illustrative and not limiting), it is noted that modifications and variations can be made by persons skilled in the art in light of the above teachings. For example, the story segmentation might be applied domains other than broadcast news. More media elements (such as icon images) might be included during the dialogue-based searching phase, and dynamic training for speaker segmentation might be employed to improve model-based anchorperson identification. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A method comprising steps of:
classifying a media collection comprising program content and television commercials as classified program content versus classified television commercials, wherein the television commercials are presented chronologically separate from the program content and in a same display screen as the program content;
identifying program segments within the classified program content based on synchronizing recognized speech in each identified segment with captioning to extract stories and to yield synchronized speech, wherein synchronizing recognized speech comprises:
recognizing speech in the media collection to yield recognized speech,
generating word timestamps based on the recognized speech, and
aligning the captioning with the recognized speech based on the word timestamps;
indexing the media collection to create an indexed library based on the program segments to yield an indexed media collection;
receiving at a server a search query to the indexed media collection from a user;
searching the indexed library to identify a set of candidate program segments based on the search query; and
presenting at a client device of the user the set of candidate program segments for the user to browse and select.

2. The method of claim 1, wherein:
the step of indexing further includes a step forming a browseable image for each segment of the set of candidate program segments, each browseable image including keywords identified in the searchable text data for display in the browseable image; and
the step of presenting includes selecting a display segment from the set of candidate program segments and displaying the associated browseable image with associated keywords.

3. The method of claim 2, wherein:
each browseable image further includes key images identified in the indexed library for display in the browseable image; and
the step of displaying the associated browseable image further comprises displaying associated key images.

4. The method of claim 2, wherein:
the searchable text data associated with the selected display segment includes a first word having low information content and a second word having high information content; and
the step of forming a browseable image includes selecting the second word as a keyword and rejecting the first word as a keyword.

5. The method of claim 1, wherein:
the step of indexing further includes a step forming a browseable image for each segment of the set of candidate program segments, each browseable image including key images identified in the indexed library for display in the browseable image; and
the step of browsing includes selecting a display segment from the set of candidate program segments and displaying the associated browseable image.

6. The method of claim 5, wherein:
the media associated with the selected display segment includes an image of an anchor-person having low information content and a field shot image of an event having high information content; and
the step of forming a browseable image includes selecting the field shot image as a key image and rejecting the image of the anchor-person as a key image.

7. A system for video indexing and delivery, the system comprising:
a first module configured to classify video into program segments versus television commercial segments, wherein the television commercials are presented chronologically separate from the program content and in a same display screen as the program content;
a second module configured to identify speaker segments within the program segments based on speaker voice characteristics to yield identified speaker segments;
a third module configured to extract stories from the identified speaker segments based on synchronizing speech with closed captioning of the identified speaker segments, the synchronizing based on:
recognizing speech in the video,
generating word timestamps based on the recognized speech, and
aligning the captioning with the recognized speech based on the word timestamps;
a fourth module configured to receive a natural language query;
a fifth module configured to select key frames from identified speech segments in response to the query; and
a sixth module configured to present the key forms to a user device for browsing by the user.

* * * * *